United States Patent [19] [11] 3,784,927
Rudolph [45] Jan. 8, 1974

[54] GAS LASER
[75] Inventor: Joseph Rudolph, Augsburg, Germany
[73] Assignee: Patent-Treuhand-Gesellschaft fur elektrische Gluhlampen mbH, Munich, Germany
[22] Filed: June 6, 1972
[21] Appl. No.: 260,193

[30] Foreign Application Priority Data
June 11, 1971 Germany .................. P 21 29 142.9

[52] U.S. Cl. .................................. 331/94.5, 330/4.3
[51] Int. Cl. ............................................. H01s 3/02
[58] Field of Search ..................... 331/94.5; 330/4.3

[56] References Cited
UNITED STATES PATENTS
3,566,302  2/1971  Rhodes ............................ 331/94.5
3,516,009  6/1970  Lipsett ............................. 331/94.5
3,495,119  2/1970  Kolb, Jr. .......................... 331/94.5
3,613,027  10/1971  Westermeier ..................... 331/94.5

Primary Examiner—William L. Sikes
Attorney—Flynn & Frishauf

[57] ABSTRACT

A discharge tube is located coaxially within an outer envelope and in pressure balance communication with the latter. Resonator mirrors are fastened to its respective ends. The discharge tube is elastically supported at several points relative to the outer envelope but rigidly supported at only one point, to permit differential thermal expansion of the tube within the envelope.

8 Claims, 2 Drawing Figures

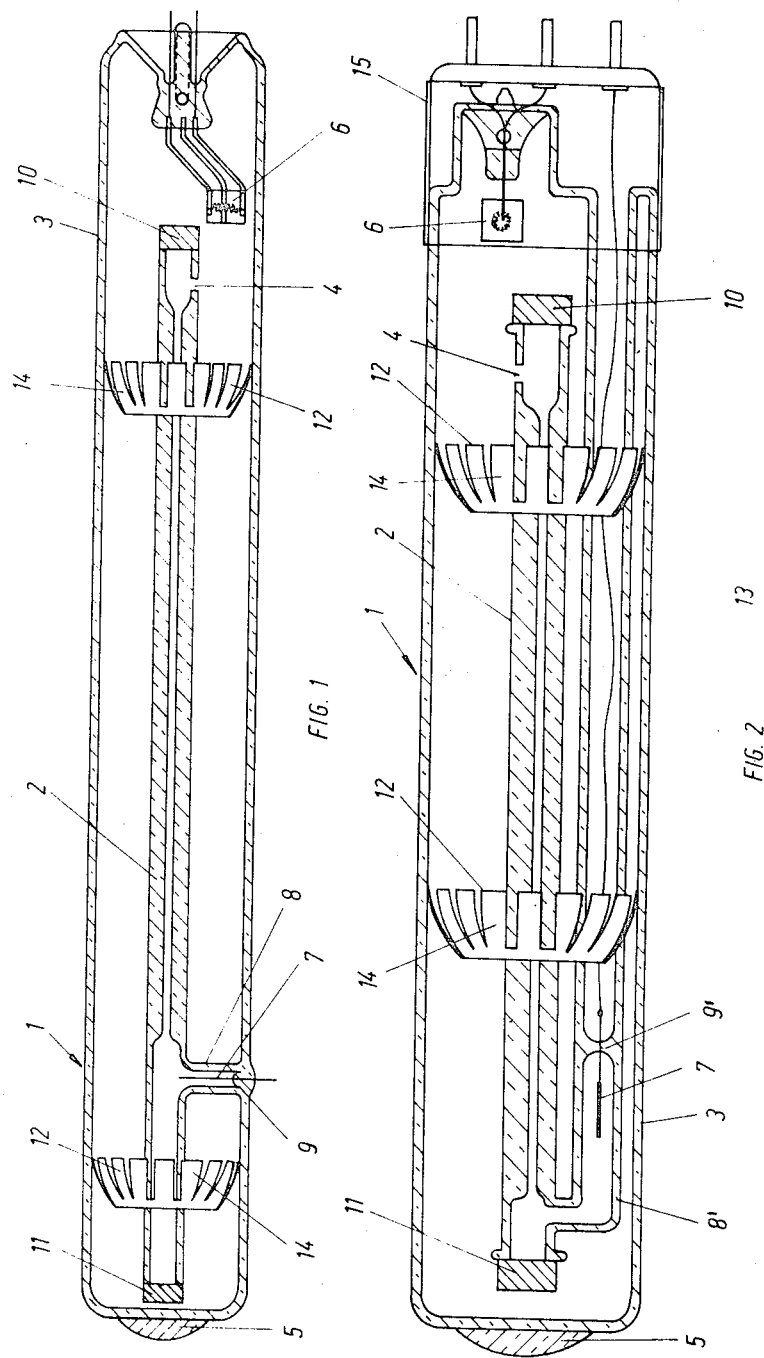

:# GAS LASER

The invention relates to a gas laser comprising a tubular discharge tube, solid electrodes for excitation of the stimulable gaseous medium, and an optical resonator formed by two resonator mirrors, one of which is totally reflective, whereas the other one is partially transmissive to radiation.

It is well known to locate the resonator mirrors separate from the discharge tube on an optical bench and to close the discharge tube off from the exterior by windows inclined at the Brewster angle. Without the provision of Brewster windows, the hermetic closure of the discharge tube from the ambient atmosphere is effected by the resonator mirrors themselves By the omission of Brewster windows, an increased radiation output, almost twice the radiation output is obtained as compared with gas laser comprising Brewster windows. Because of the temperature-sensitive dielectric reflecting resonator coatings, the resonator mirrors are fastened to the discharge tube not by melting on or soldering but they are fastened to the ends of the discharge tube with a cement. Among the known inorganic and organic cements, the organic cements are best suited. It was found, however, that even with these cements sealing of the tube is not such as to guarantee troubleproof operation of the gas laser after even a few years. In course of time, water vapor diffuses from the surroundings through the cementitious seal into the discharge tube. Both operational and shelf life of the gas laser is thereby limited. Moreover, when exhausting the discharge tube, only a low heating temperature is permissible because of the thermo-sensitivity of the organic cement.

A known gas laser of stimulated emmission in a gaseous medium of all-glass design comprises a tubular discharge tube with an auxiliary tube in coaxial arrangement thereto and supporting the resonator mirrors. This assembly is disposed in a hermetically sealed outer envelope in coaxial alignment therewith, and the outer envelope is provided with exit windows for the laser radiation. The individual tubes are provided with breakthroughs so as to establish mutual pressure balance. The auxiliary tube is fastened to lateral extensions of the discharge tube with electrodes disposed therein; the lateral extensions in their turn are sealed to the outer envelope.

This type of structure is difficult to construct. In particular, the rigid two-point mounting support of the discharge tube within the outer envelope leads, in operation, easily to deformations and to fracture of the gas laser because of the different heating of the discharge tube on the one hand, and the outer envelope on the other hand.

The invention relates to a gas laser construction, in which a tubular discharge tube is provided to contain solid electrodes for excitation of the stimulable gaseous medium, and an optical resonator formed by two resonator mirrors one of which is totally reflective, whereas the other one is partially transmissive to radiation. A hermetically sealed outer envelope, in coaxial arrangement, surrounds the discharge tube; it is provided with an exit window and likewise contains the stimulable gaseous medium. A pressure balance communication with the discharge tube is provided.

SUBJECT MATTER OF THE PRESENT INVENTION

The discharge tube is supported within and by the outer envelope at several points; the discharge tube is provided with resonator mirrors fastened to the ends thereof, and is rigidly supported only at one of the points of support by the outer envelope.

The direct mounting of the resonator mirrors on the discharge tube facilitates manufacture of a gas laser comprising an outer envelope. For instance, an auxiliary tube for support of the resonator mirrors may be omitted. Fastening of the mirrors need not necessarily be effected by an organic cement; instead, springs or clamps holding the resonator mirrors may be used or, alternatively, an inorganic cement which is resistant to elevated temperatures, because a hermetic closure of the discharge tube by the resonator mirrors is superfluous. The heating or flashing temperature may be increased, for instance, to 350°C. Since only one rigid connection of the discharge tube to the outer envelope is used, danger of fracture of the discharge tube upon thermal expansion thereof is practically eliminated.

The invention will be described by way of example with reference to the accompanying drawings, wherein:

FIGS. 1 and 2 are longitudinal sectional views of two embodiments of the gas laser.

The gas laser 1 (FIG. 1) comprises a tubular discharge tube 2, namely a discharge capillary of glass or quartz glass with a diameter of about 2 mm, containing a stimulable gaseous medium disposed in a hermetically sealed outer envelope 3. This outer envelope may be designed to be partially or totally of radiation-transmissive material such as glass. The outer envelope 3 is disposed coaxially to the discharge tube. It contains likewise the stimulable gaseous medium and is in pressure balance communication with the discharge tube through a small aperture 4. The discharge tube 2 is provided at its respective ends with resonator mirrors of which mirror 10 is totally reflective, whereas mirror 11 is partially radiation-transmissive. The mirrors are fastened to the front faces of discharge tube 2 by an inorganic cement unaffected by changes of temperature such as a sodium silicate cement. The front faces are ground plane-parallel. However, to facilitate alignment of the resonator mirrors, it is desirable to provide the front faces with ground-in ball-and-socket joints.

A plane-parallel disk or a lens 5 of suitable material such as glass for reducing divergence of radiation is used as exit window for the laser radiation. For example, the disk or lens may be fastened to the outer envelope 3 by glass solder. The exit window may alternatively be formed by a lens-shaped thickening of the outer envelope 3 itself.

Solid electrodes 6, 7 are used for excitation of the stimulable medium which are hermetically sealed into the outer envelope 3. The aperture 4 is narrow so that contamination of the resonator mirrors by sputtered cathode material is prevented.

While one of the electrodes, 6, which is either a cold emission cathode of aluminum or a heated oxide cathode such as a tungsten coil with emitter paste, is located outside the discharge tube 2, electrode 7 which is a rod-shaped anode, for instance of nickel, is disposed in a tubular side extension 8 of discharge tube 2. This extension is sealed at 9 to the outer envelope 3. Support elements provided on the discharge tube 2, for instance, metallic support rings 14 with elastic flaps 12 are supporting the discharge tube within the outer envelope. They are not rigidly connected to the outer envelope but are only resiliently abutting the inner wall of the outer envelope. The only rigid connection is at 9, where a rigid support of the discharge tube 2 relative to outer envelope 3 is established. Within the region of the exit window, the outer envelope is only provided with metal-to-glass seals or, possibly with a glass soldering or melting junction. Intrusion of gases and vapors from the ambient atmosphere is impossible and the laser is sealed for years.

FIG. 2 shows another embodiment of a gas laser in accordance with the invention. The tubular side extension 8', with electrode 7 extends parallel to discharge tube 2 and is sealed at 9' to a re-entrant section 13 of the front face of outer envelope 3 into which cathode 6 is likewise sealed. The embodiment as shown in FIG. 2 is provided with a base 15 for insertion of the gas laser in a suitable socket. Of course, the construction of FIG. 1 may also be provided with a suitable base.

The fill of the gas laser according to the invention may be a helium-neon gas mixture in a ratio of from 6:1 to 10:1 with a fill pressure of from 1 to 2 torr. If the length of the discharge capillary is from about 15 to 25 cm, with a capillary diameter of about 2 mm, then the operating voltage is between 800 and 1,200 V with operating currents of from 8 to 10 milliamps. The radiation output is from 3 to 8 mW.

I claim:

1. A gas laser comprising:
   an elongated discharge tube (2), a stimulable gaseous medium therein and two resonator mirrors (10, 11) carried thereon, secured to the ends thereof and oriented to form an optical resonator, one of said mirrors (10) being totally reflective and the other (11) being partially transmissive to radiation;
   a hermetically sealed outer envelope (3) coaxially aligned and totally hermetically enclosing both said discharge tube (2) and said mirrors (10, 11), containing said stimulable gaseous medium and provided with an exit window (5) for radiation output;
   an aperture (4) in the wall of said discharge tube (2) to provide communication between said stimulable gaseous medium in said discharge tube (2) and said stimulable gaseous medium surrounding said discharge tube and thereby to equalize pressure at the front and back of said mirrors (10, 11);
   solid electrodes (6, 7) disposed for excitation of said stimulable gaseous medium at least in said discharge tube; and
   a support structure to support said discharge tube (2) within said outer envelope (3) comprising one rigid support element (8, 8') and at least one resilient support element, said support elements being disposed so as to avoid risk of deformation or fracture from differential heating of said discharge tube (2) on the one hand, and said outer envelope (3) on the other hand, said resilient support element or elements each comprising a support ring and elastic flaps separated by slots and each being in bearing contact with said discharge tube and said outer envelope, with at least one of said bearing contacts being provided by means of said flaps.

2. A gas laser according to claim 1, wherein said rigid support element (8, 8') comprises a tubular side extension of said discharge tube (2) that is sealed (9) to said outer envelope (3).

3. A gas laser according to claim 2, wherein said tubular side extension (8) extends radially between said discharge tube (2) and said outer envelope (3), and wherein each resilient support element (14) comprises a support ring encircling said discharge tube (2) and has elastic flaps (12) abutting the inner wall of said outer envelope (3).

4. A gas laser according to claim 2, wherein said tubular side extension is near one end of said discharge tube (2), and wherein one of said solid electrodes (7) is exposed to said stimuable gaseous medium only in said tubular side extension (8), and wherein further, said aperture is located near the end of said discharge tube (2) remote from said tubular side extension (8) and the other of said solid electrodes (6) communicates with said stimuable gaseous medium outside of said discharge tube in the neighborhood of said aperture (4).

5. A gas laser as defined in claim 4, in which said totally reflective mirror (10) is located at the end of said discharge tube (2) nearer to said aperture (4).

6. A gas laser according to claim 2, wherein said tubular side extension (8') of said discharge tube (2) has a portion disposed parallel to said discharge tube, wherein further said outer envelope has a reentrant section (13) and wherein, further, said tubular side extension (8') has its portion which is disposed parallel to said discharge tube (2) sealed (9') to said reentrant section (13) of said outer envelope (3).

7. A gas laser according to claim 2, wherein said outer envelope (3) has a reentrant portion (13), wherein said tubular side extension (8') of said discharge tube (2) is sealed (9') to said reentrant portion (13) of said outer envelope (3) and wherein, further, said tubular side extension (8') communicates with said discharge tube (2) near one end thereof and contains the portion of one of said solid electrodes (7) exposed to said stimuable gaseous medium, and wherein, further said aperture (4) is near the end of said discharge tube (2) remote from said side extension (8') and the other of said solid electrodes (6) is exposed to said stimuable gaseous medium outside said discharge tube (2) in the neighborhood of said aperture (4).

8. A gas laser according to claim 1, wherein each of said resilient supports (14) comprises a dished or cupped annular disc having slotted portions adjacent at least one edge, said annular disc being in bearing contact with said tube and said envelope and at least one of said bearing contacts including at least some of said slotted portions.

* * * * *